UNITED STATES PATENT OFFICE.

JOHANN HEINRICH BONER, OF LUDWIGSHAFEN-ON-THE-RHINE, AND OSCAR BALLY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRACENE COMPOUNDS AND PROCESS OF MAKING SAME.

1,026,557.        Specification of Letters Patent.       Patented May 14, 1912.

No Drawing.      Application filed August 14, 1908. Serial No. 448,608.

*To all whom it may concern:*

Be it known that we, JOHANN HEINRICH BONER and OSCAR BALLY, doctors of philosophy and chemists, citizens of the Swiss Republic, residing, respectively, at Ludwigshafen-on-the-Rhine and Mannheim, Germany, have invented new and useful Improvements in Anthracene Compounds and Processes of Making Same, of which the following is a specification.

We have invented new coloring compounds of the anthracene series and as a step in their production we obtain new valuable intermediate compounds, namely halogen anthraquinone sulfonic acids. We have discovered that anthraquinone sulfonic acids can be halogenated by treating them with halogen, or a compound evolving halogen, in the presence of strong including fuming, sulfuric acid and either in the presence of a halogen carrier, or not, and that the halogen anthraquinone sulfonic acids so obtained can be converted into coloring matter by treatment with ammonia, or with a primary, or secondary, amin, of either the aliphatic, or the aromatic series. The coloring matters can be produced by heating the halogen anthraquinone sulfonic acid, or a salt thereof, with ammonia, or with the amin, with, or without, the addition of a diluting agent, or flux. Instead of the amins themselves, derivatives thereof may be employed, such for instance as their sulfonic acids, in which case it is preferable to use them in the form of their salts. We include under the term amino compound, both ammonia, and also any one of the amins or derivatives thereof above indicated. Some of the coloring matters thus obtainable are new, others have been previously described.

The new coloring matters obtainable by treating 1.4-dihalogen-anthraquinone-2-sulfonic acid with an anilin sulfonic acid, for instance sulfanilic acid and metanilic acid, possess the following properties: They are soluble in water yielding from fuchsin red to blue-green solutions they yield olive to blue solutions in concentrated sulfuric acid, and they dye unmordanted wool from red to blue-green shades.

Halogen anthraquinone sulfonic acids which are especially suitable for use in preparing coloring matters according to this invention are 1.4-dichloranthraquinone-2-sulfonic acid and the chloranthraquinone-1-sulfonic acid, hereinafter described under Examples 1 and 3 respectively. When a dihalogen compound is employed, either one, or both, of the chlorin atoms can be replaced by amin residues, according to the conditions under which the reaction is carried out. The two halogen atoms can be substituted by different residues, first one atom being replaced and subsequently the second atom being replaced, or, in some cases, different amin compounds can be made to react at the same time on the same dihalogen compound. The coloring matters thus obtainable vary greatly in shade, for instance either red, blue, green, or even black, coloring matters can be obtained. They are generally soluble in water, but, if desired, they can be treated with a sulfonating agent and more sulfonic acid groups can be introduced, thus increasing the solubility of the coloring matters.

The following examples will serve to illustrate further the nature of our invention and how it can be carried into practical effect, but the invention is not confined to these examples. The parts are by weight and the temperatures are in degrees centigrade.

Example 1: Dissolve one hundred parts (100) of the sodium salt of anthraquinone-2-sulfonic acid in six hundred (600) parts of ninety-six (96) per cent. sulfuric, and, at a temperature of about one hundred and sixty (160) degrees, pass in a current of chlorin until the weight of the melt remains constant. Allow the melt to cool, pour it into water, and recover the sodium salt of dichloranthraquinone sulfonic acid by salting out the solution, filtering, pressing and drying. The product is a light yellow powder which can be obtained in the form of light yellow, glittering scales by crystallization from ninety (90) per cent. acetic acid. Analysis points to the presence of the sodium salt of dichloranthraquinone sulfonic acid and, since the replacement of the halogen atoms by hydroxyl yields a quinizarin sulfonic acid, the product must contain the two chlorin atoms in the 1.4-position.

Example 2: Dissolve, at ordinary temperature, one hundred (100) parts of the sodium salt of anthraquinone-2-sulfonic acid in six hundred (600) parts of fuming sulfuric acid containing twenty-three (23) per cent. free $SO_3$. Add one part of iodin, or iodin-chlorid, and then pass in a current of dry chlorin until the increase in weight is about thirty-five (35) parts. Pour the melt into water and dilute till a solution is obtained. Filter off the iodin which has not been acted upon, and then add common salt until the sodium salt of dichloranthraquinone sulfonic acid is salted out. The product is similar to that described in the foregoing Example 1. In this example, if bromin be employed instead of chlorin, and the temperature be maintained at about thirty (30) degrees, a monobrom derivative is obtained.

Example 3: Chlorinate one hundred (100) parts of the sodium salt of anthraquinone-1-sulfonic acid according to the method described in the foregoing Example 2. The chloranthraquinone-1-sulfonic acid obtained can be crystallized from ninety (90) per cent. acetic acid and obtained in the form of small yellow crystals. Instead of anthraquinone monosulfonic acids, disulfonic acids can be employed, and instead of chlorin either bromin, or compounds of halogen, can be used.

Example 4: Heat together, in an autoclave, for about six (6) hours, at a temperature of one hundred and fifty (150) degrees, one part (1) of the sodium salt of 1.4-dichloranthraquinone-2-sulfonic acid and three (3) parts of a twenty (20) per cent. aqueous ammonia solution. When the red solution obtained is cold, neutralize it and precipitate the coloring matter by means of common salt. It is a brown-red powder which is easily soluble in water, the solution being violet-red. Its solution in concentrated sulfuric acid is yellow. It dyes unmordanted wool Bordeaux red.

Example 5: Boil together ten (10) parts of the sodium salt of 1.4-dichloranthraquinone-2-sulfonic acid, two hundred and fifty (250) parts of paratoluidin, and four (4) parts of anhydrous sodium acetate, until the color of the blue-green melt does not increase in intensity. Then remove the excess of paratoluidin by means of benzene, or ether, or dilute acid, or other suitable agent, and purify the coloring matter by dissolving it in water and precipitating it with salt. It is a dark green powder which yields a green solution in water and a violet solution in concentrated sulfuric acid. It dyes unmordanted wool green.

Example 6: Heat together, in an enameled autoclave, for ten (10) hours, at two hundred (200) degrees, one hundred (100) parts of the sodium salt of chloranthraquinone-1-sulfonic acid, one hundred and sixteen (116) parts of the sodium salt of paratoluidin-ortho-sulfonic acid, thirty-six (36) parts of crystallized sodium acetate, and three hundred and forty parts of water. When the melt is cold, stir it up with a solution of common salt and filter off the crystalline coloring matter, which is easily soluble in water, yielding a green-blue solution, and in concentrated sulfuric acid, giving a green color. It dyes unmordanted wool clear green shades. This coloring matter is new.

Example 7: Heat together, in an autoclave, for ten (10) hours, at a temperature of one hundred and fifty (150) degrees, ten (10) parts of 1.4-dichloranthraquinone-2-sulfonic acid, twenty-five (25) parts of sodium sulfanilate and twenty-five (25) parts of water. The coloring matter so obtained is a brown-red powder which yields a fuchsin red solution in water, and an olive solution in concentrated sulfuric acid, and dyes unmordanted wool red. This coloring matter is new.

Example 8: Heat together, in an enameled autoclave, for ten (10) hours, at two hundred (200) degrees, ten (10) parts of the sodium salt of 1.4-dichloranthraquinone-2-sulfonic acid, eight (8) parts of crystallized sodium acetate, and sixty-eight (68) parts of a twenty-five (25) per cent. solution of sodium metanilate. Dilute the cold melt with common salt solution and filter off the crystalline coloring matter, which is easily soluble in water, yielding a blue-green solution. It yields a blue solution in concentrated sulfuric acid and dyes unmordanted wool clear blue-green shades. This coloring matter is new.

Example 9: If, in the foregoing Example 8, the sodium metanilate be replaced by an equivalent quantity of the sodium salt of 2-naphthylamin-5-sulfonic acid, a coloring matter is obtained which dyes wool bright yellow-green shades. It yields a yellow-green solution in water and a violet-blue solution in concentrated sulfuric acid. This coloring matter is new.

Example 10: Heat together for six (6) hours, at about two hundred (200) degrees, in an autoclave, ten (10) parts of 1.4-dichloranthraquinone sulfonic acid, ten parts of paratoluidin metanilate, seven and a half (7.5) parts of crystallized sodium acetate, and ten (10) parts of water. Then stir the cold melt with common salt solution and filter off the coloring matter, which is a dark powder yielding a dull blue-green solution in water and a violet solution in concentrated sulfuric acid. It dyes unmordanted wool, yielding from grayish green, to green-black, shades.

Now what we claim is:

1. The process of producing compounds of the anthracene series by treating an anthraquinone sulfonic acid which is free from nitrogen, with a halogenizing agent in the presence of strong, including fuming, sulfuric acid, and treating the product obtained with an amino compound containing at least one hydrogen atom attached to the nitrogen atom.

2. The process of producing compounds of the anthracene series by treating an anthraquinone sulfonic acid which is free from nitrogen, with a halogenizing agent in the presence of strong, including fuming, sulfuric acid, and in the presence of a halogen carrier, and treating the product obtained with an amino compound containing at least one hydrogen atom attached to the nitrogen atom.

3. The process of producing compounds of the anthracene series by treating an anthraquinone sulfonic acid which is free from nitrogen, with a halogenizing agent in the presence of strong, including fuming, sulfuric acid, and in the presence of a halogen carrier, and treating the product obtained with an amino compound containing at least one hydrogen atom attached to the nitrogen atom, and then sulfonating.

4. As new articles of manufacture the anthracene compounds which are condensation products of 1.4-dihalogenanthraquinone-2-sulfonic acid with an anilin-sulfonic acid, which new compounds are soluble in water yielding from fuchsin red to blue-green solutions, which yield olive to blue solutions in concentrated sulfuric acid, and which dye unmordanted wool from red to blue-green shades.

5. As a new article of manufacture the anthracene compound is a condensation product of 1.4-dichloranthraquinone-2-sulfonic acid with sulfanilic acid, which new compound is soluble in water yielding a fuchsin red solution, which yields an olive solution in concentrated sulfuric acid, and which dyes unmordanted wool red.

In testimony whereof we have hereunto set our hands in the presence of two subscribing witnesses.

JOHANN HEINRICH BONER.
OSCAR BALLY.

Witnesses:
 J. ALEC. LLOYD,
 RAY SIGSBEE.